July 17, 1934. J. W. MENHALL 1,966,637
POWER ACTUATED SWIVEL HEAD FOR EARTH BORING MACHINES
Filed Feb. 6, 1931 4 Sheets-Sheet 1
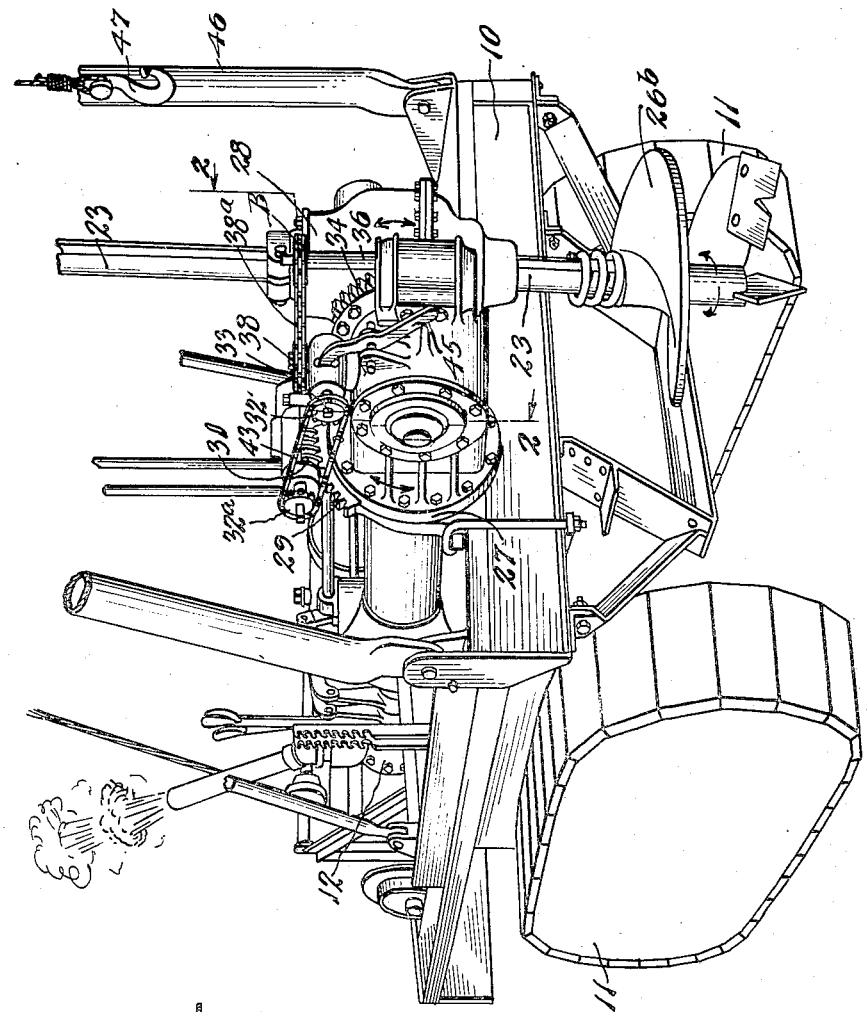
Inventor
JAMES W. MENHALL
By Robb&Robb
Attorneys

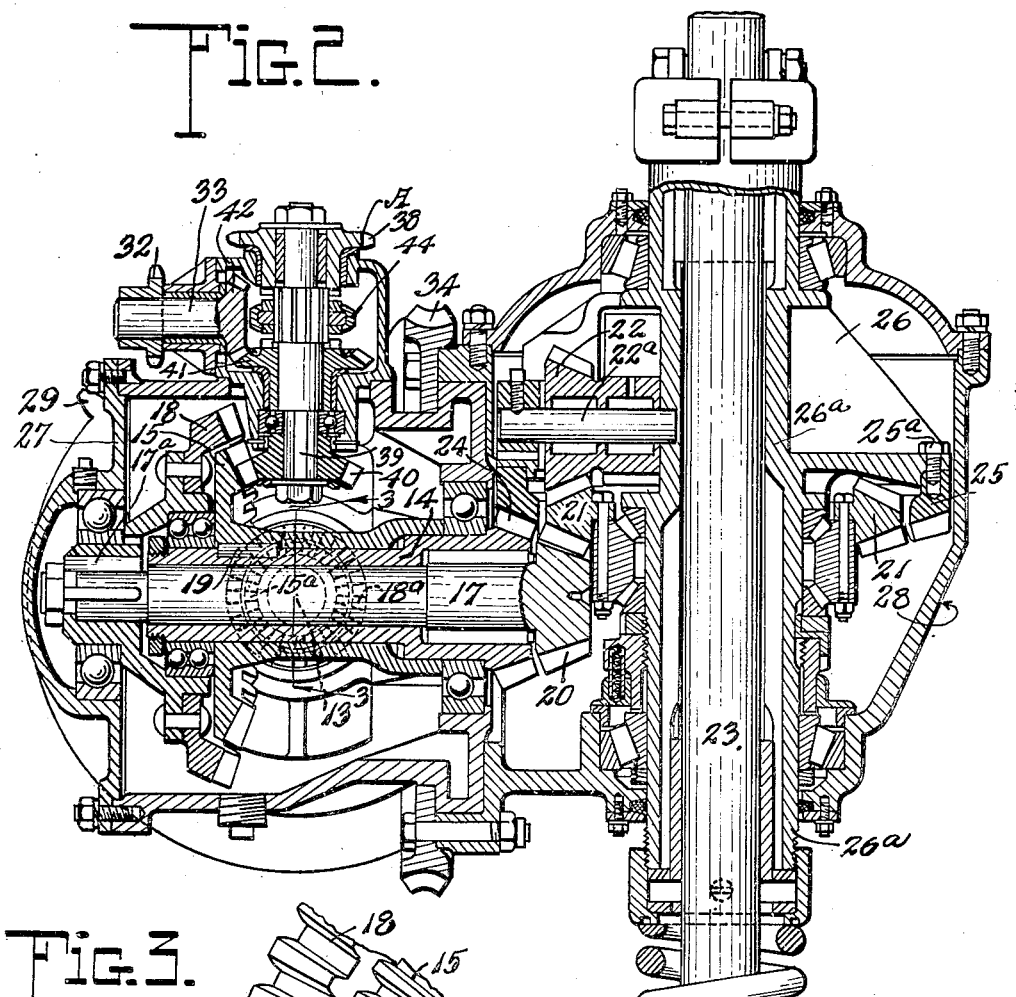

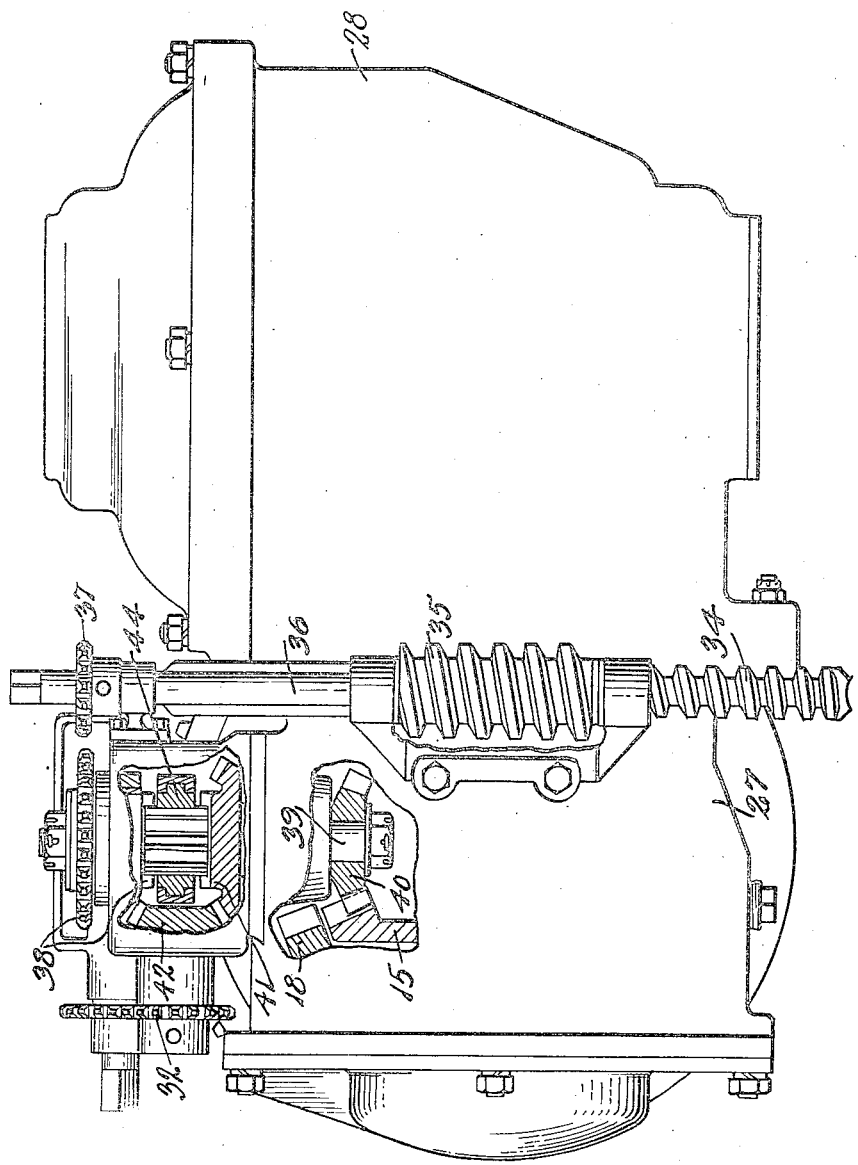

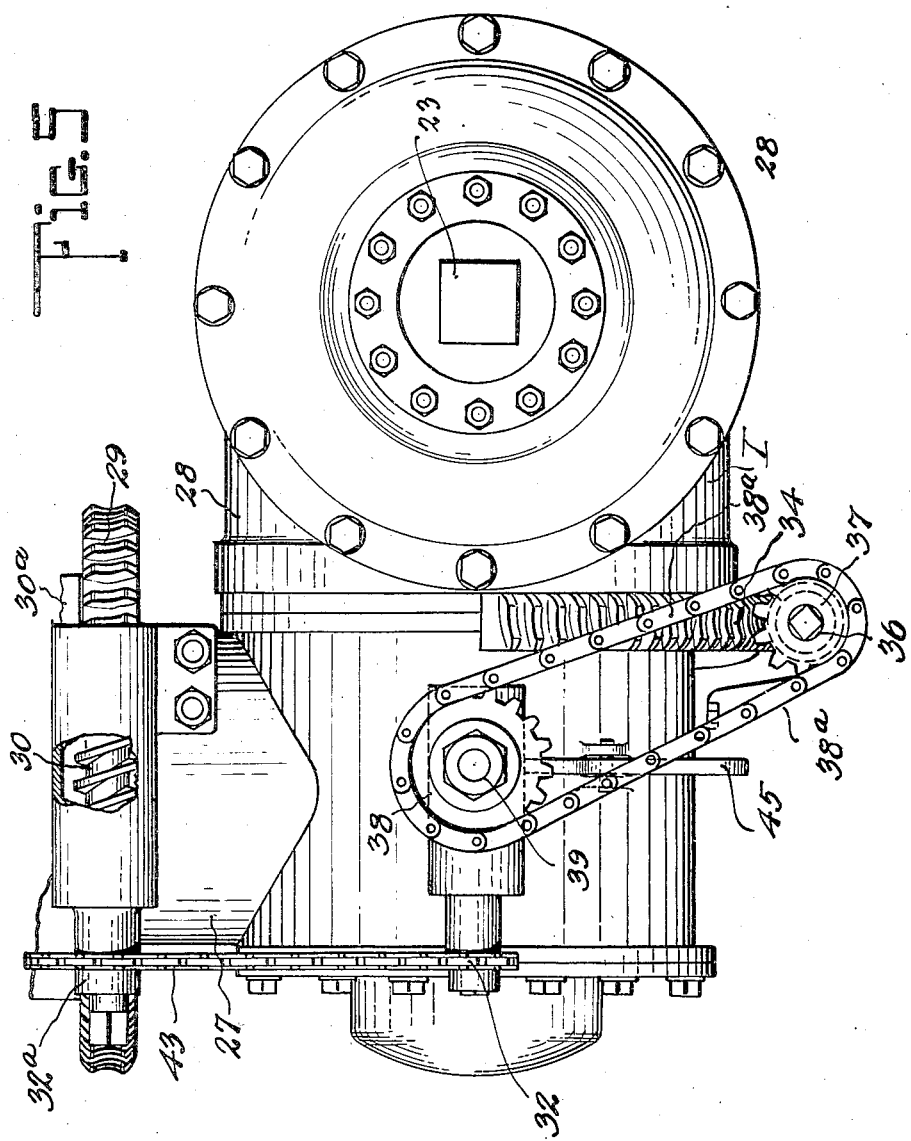

Patented July 17, 1934

1,966,637

UNITED STATES PATENT OFFICE 1,966,637

POWER ACTUATED SWIVEL HEAD FOR EARTH BORING MACHINES

James W. Menhall, Edgerton, Wis., assignor to Highway Trailer Company, Edgerton, Wis., a corporation Application February 6, 1931, Serial No. 513,976

8 Claims. (Cl. 255—19)

Earth boring machines comprising power driven augers are widely employed in the setting of fence posts, telephone and telegraph poles, and many other operations where an object is to be placed in position in the ground, the auger being so designed to bore a hole of predetermined size and depth, and also to bore a hole of any desired inclination to the surface of the ground.

Because of the uneven nature of the terrain on which these machines are very often required to operate, it is necessary, in order that objects shall be placed perpendicularly, that there be provision made for adjusting the auger angularly in order to compensate for such irregularities in the surface of the ground.

Since it is also necessary, where large objects, such as telephone or telegraph poles, are being set to provide an anchor for such objects, the auger must be also capable of longitudinal angular adjustment, since these anchors are placed usually at an angle to the object.

It is accordingly customary to support the auger on a pair of head members which are swiveled on the body of the machine, these head members being adapted to be angularly adjusted in a horizontal plane, relative to the machine, to enable desired positioning of the auger for vertical boring, one head member permitting adjustment in the vertical plane to afford the required angular adjustment longitudinally of the auger when it is desired to bore a slanting hole. These adjustments have been carried out, previously to this invention, manually, by attaching a lever to the desired head member and then by application of the required force to the lever by an operator, the head member is turned to the predetermined angle of adjustment in, order to bore the hole either perpendicularly or slantingly, as conditions of operation may require. It will be apparent that such manual adjustment is difficult to carry out.

The present invention has for its object to substitute for this manual adjustment a mechanical power actuation of the power head members, so that the required adjustments may be effected by taking off power from a suitable source, such as the engine which propels the machine and which engine also furnishes the power for the operation of the auger.

In general, this object is carried out by interconnecting with a main power shaft driven by the engine, a system of gears for transmitting power selectively to each head, and by providing suitable clutch mechanism for selectively operating the gears so that either head may be turned and the auger positioned in its desired adjustment.

The invention will be more readily understood by reference to the accompanying drawings, in which:

Figure 1 represents a front view of an earth boring machine provided with a power actuated swivel head formed in accordance with this invention.

Figure 2 is a vertical section through the line 2—2 of Figure 1.

Figure 3 is a fragmentary horizontal view taken on the line 3—3 of Figure 2, the view being at right angles to the plane of Figure 2, and, Figure 4 is a side elevation of the swivel head of this invention, with parts broken away to show details of the construction of the gear connections.

Figure 5 is a plan view of the power head, showing the mounting of the actuating means for the power head members.

As will be seen from the drawings, and particularly from Figure 1, the earth boring machine comprises a frame carrying a crane and the various driving instrumentalities, the boring operations being carried out by an auger mounted for both horizontal and vertical (longitudinal) angular adjustment, and endless traction devices are also provided for moving the machine along the ground.

There is also provided a suitable source of power, such as an internal combustion engine, and there are also clearly shown in Figure 1, various auxiliary equipments which need not be specifically mentioned, since such are not included in the invention.

The principal feature of this invention lies in the power turned head carrying the auger, and in the instrumentalities transmitting power thereto from the source so that the auger is automatically adjustable to any angular position by power transmitted from the engine, as well as being driven thereby for earth boring operations.

For completeness of the description of the invention, however, certain of the other driving instrumentalities will be described, rather fragmentarily, as forming no part of the novelty of this invention.

The "head" referred to as carrying the auger is formed of two members turnable together horizontally for effecting the desired positioning of the auger for vertical boring operations; one of the members, i. e. the member directly carrying the auger, is swiveled vertically relative to the other member for enabling boring operations to be carried out of any desired angle to the vertical, as has been customary in the art. As has been previously pointed out, however, it has not been heretofore known to actuate these members by power taken from the engine.

Referring now more particularly to the drawings, the numeral 10 represents, generally, the frame of an earth boring machine embracing the present invention. The machine being mounted upon endless traction devices 11, propelled from a suitable source of power, such as the engine 12. The engine 12 also drives the power shaft 13, which has keyed thereto, a sleeve 14a. To the end of the shaft 13 is secured a gear 15a the end of the shaft being tapered, as shown in Figure 3, to tightly receive the gear 15a which is secured in position by a nut 16. The sleeve 14a terminates in a gear 18a. The gears 15a and 18a are substantially concentric and mesh with gears 15 and 18 which operate various instrumentalities, as will be hereinafter described.

Gear 18, in fact, drives a shaft 17 being secured to the shaft through a key 17a, the shaft 17 being the shaft which transmits power from the power shaft 13 to the auger for bringing the auger into and out of contact with the ground. The shaft 17 may be brought into operative engagement with the driving shaft 13 by suitable clutch, or other well known means, not shown, and terminates in a gear 20 which in turn meshes with a gear 21. Gear 21 interengages with a gear 22 which turns about a shaft 22a, the gear 22 being in engagement with well known racking instrumentalities for racking the auger shaft 23 upwardly and downwardly.

The shaft 17 is surrounded by a sleeve 14 to which the gear 15 is secured by a key 19, the sleeve 14 being thereby rotated by the gear 15. The sleeve 14 terminates in a gear 24 which meshes with a ring gear 25, which ring gear 25 is connected, as shown at 25a with the rotative casing 26, of which the sleeve 26a around the shaft 23 is an integral portion. The casing 26 and sleeve 26a are thus rotated, and since the shaft 23 is not rotative independently of the sleeve, but only slidable therein, the shaft 23 is rotated along with the sleeve 26a, thus rotating the auger blades 26b during boring operations.

The swivel head which permits lateral and longitudinal angular adjustment of the auger comprises two power head members, indicated at 27 and 28 respectively, the members being turnable together as indicated by the arrow on the member 27, which member is provided with the worm 31, which worm is journalled in a suitable housing secured to the member 27. Power for turning the head is transmitted to the gear through this worm, which in turn is driven by a sprocket wheel 32 mounted on a shaft 33 and sprocket 32a on the worm shaft 30; the sprockets 32 and 32a are interconnected by chain 43, as will be set forth in more detail hereinafter, as well as the details of the power transmitting instrumentalities for driving the shaft 32.

The worm 31 is in mesh with the gear 29 mounted on the stationary part 30a, whereby rotation of the worm on the gear causes it to travel along the teeth thereof to correspondingly move the power head members 27 and 28.

The gear 34 is mounted on the power head member 28, which is swiveled relative to the member 27, the worm 35 which engages the gear 34 being located on the shaft 36, as will be clear from the drawings. The shaft 36 carries a sprocket 37, adapted to be driven from sprocket 38 on shaft 39 through the instrumentality of the sprocket chain 38a, operation of which of course, causes the power head member 28 to turn relative to the member 27 through engagement of the worm 35 with gear 34.

This sprocket wheel 38 is, in fact, one of a pair of gears carried by the shaft 39. The shaft 39 takes its power from a gear 40 which is intermeshed with the gear 15 on the shaft 17.

The shaft 39 also carries a gear 41 which is spaced apart from the gear or sprocket wheel 38, and meshes with the gear 42 on the shaft 33. By this means, power is transmitted to the sprocket wheel 32 for driving a sprocket wheel 32a for actuating the worm 30 through the medium of the chain 43, thereby turning the power head members back and forth as indicated by the double arrow member 27 of Figure 1.

There is also provided on the shaft 39 a clutch mechanism 44 which is adapted to selectively engage either the gear 41, or the sprocket wheel 38. The operating means may be a lever 45, indicated in Figure 1.

When the lever 45 is moved to engage the clutch 44 with the gear 41, power is transmitted to the sprocket wheel 32, and the worm 30 is driven through the chain 43 as above set forth. When the lever 45 is moved to engage the clutch 44 with the sprocket wheel 38, the sprocket wheel 37 on the end of the worm shaft 36 is driven through a chain 38a, thereby actuating the worm 35 and turning the head 28 as indicated by the arrows on Figure 1, thereby imparting the desired angular adjustment of the auger 26b with respect to the longitudinal axis of the machine.

There may be mounted upon the frame, a conventional crane structure indicated generally at 46, carrying the hook member 47.

It will, therefore, be seen that power is transmitted from the engine 12 through the driving shaft 13, and through the instrumentalities of the shafts 17 and 39, power from the engine is utilized for moving the power head members 27 and 28 into any desired position of adjustment.

The operation of the racking of the auger up and down and the transmission of power to rotate the auger shaft 23, is well known in the art, and in connection therewith, reference is had to Patent No. 1,531,226 of March 24th., 1925, and Patent No. 1,511,433 of October 14th., 1924, both issued to J. B. Spowart.

It will be apparent that modifications in the specific details of the construction herein specifically illustrated, and described, may be made by one skilled in this art without departing from the inventive concept; it will be, accordingly, understood, that it is intended and desired to embrace within the scope of this invention, such modifications and changes as may be adapted to varying conditions and uses.

Having thus described my invention, what I claim as new and desire to secure by Letters Patent of the United States, is:—

1. An earth boring machine comprising an auger, a head carrying the auger and comprising independent members movable about axes extending longitudinally and transversely of the machine respectively, to impart respectively lateral and longitudinal angular adjustment to the auger, a source of power, and means for transmitting power from the source to the respective head members to selectively move the head members, the power transmitting means comprising a shaft, gear and clutch instrumentalities on the shaft for selectively operating either head member, each head member being provided with a driving gear, driving instrumentalities for the gears, and means for imparting power to the driving instrumentalities from the shaft.

2. An earth boring machine comprising an auger, a head carrying the auger and comprising independent head members movable about axes extending longitudinally and transversely of the machine respectively to impart respectively lateral and longitudinal angular adjustment to the auger, a source of power, and means for transmitting power from the source to the respective head members to selectively move the said head members, the power transmitting means comprising a shaft, gear and clutch mechanism on the shaft for selectively operating either head member, each head member being provided with a worm gear, and driving instrumentalities for transmitting power to each worm gear, the instrumentalities comprising a worm drive for each gear, a shaft for each drive, sprocket wheels on the shafts and sprocket chains driven by the power transmitting means for driving the sprocket wheels for turning each head member.

3. A machine of the character described, comprising a source of power, a power head including a pair of power head members, an operating member carried by one of the power head members, means for turning the said members together in a direction transversely of the machine, instrumentalities for effecting relative turning between the power heads in a direction longitudinally of the machine, for effecting angular adjustment of the operating member, and means for conveying power from the power source to the said power head for actuating the power head members and the said operating member, the means for conveying power comprising a power shaft driven by the source of power, a driving shaft operated by the power shaft, gear and sprocket instrumentalities on the respective head members operated by the driving shaft, and means for transmitting motion to the gear and sprocket instrumentalities respectively for predeterminately operating the said head members.

4. An earth boring machine comprising a source of power, an auger, a power head comprising a pair of power head members, one of the said members carrying the auger the said power head members being turnable together in one direction relative to the machine, and being movable relative to each other in another direction for effecting desired adjustment of the auger transversely and longitudinally of the machine, power driven mechanism on one of said head members operable from the source of power for predeterminately operating the power head members to dispose the auger in a predetermined position, the power driven means comprising a rotating shaft, a pair of gears on the shaft for operating the head members, and a clutch device for engaging either gear of the pair selectively.

5. A machine of the character described comprising, in combination, a frame, a source of power on the frame, an operating member, a power head turnably mounted on the frame and including a pair of sections, one of which carries the operating member and which is turnable relative to the other section, power transmitting instrumentalities for transmitting power from the source of power to the head sections, drive instrumentalities on one power head section, comprising a gear rigidly mounted on the frame adjacent the power head, a second gear on said power head section meshing with the aforesaid gear to turn the power head, instrumentalities for turning the other power head section carrying the operating member comprising a gear rigidly mounted on said other section and a cooperating gear on the first mentioned section, driving devices for the last named instrumentalities, and means enabling selective operation of the drive instrumentalities on the first mentioned section of the power head.

6. A machine of the character described, comprising, in combination, a frame, a source of power on the frame, a power head on the said frame including a pair of sections turnable in different planes relative to the frame, an operating member on one of the head sections, driving means on the other head section, power transmitting means for transmitting rotation from the source of power to the said driving means, instrumentalities for turning the head section which carries the operating member, the said instrumentalities comprising a gear rigidly mounted on the last mentioned head section, a gear on the other head section and meshing with the before-mentioned gear, and instrumentalities between the said gears and driving means on the head section for rotating the gears and the head section which carries the operating member to thereby move the operating member in a vertical plane and longitudinally with respect to the frame.

7. A machine of the character described, comprising, in combination, a frame, a source of power on the frame, a power head on the said frame including a pair of sections turnable in different planes relative to the frame, an operating member on one of the head sections, driving means on the other head section, power transmitting means for transmitting rotation from the source of power to the said driving means, instrumentalities for turning the head section which carries the driving means, the said instrumentalities comprising a gear rigidly mounted on the frame, a gear on the last mentioned head section and meshing with the gear on the frame, and instrumentalities between the said gears and driving means for rotating the gears and both head sections to thereby move the operating member in a vertical plane and transverse with respect to the frame.

8. A machine of the character described, comprising, in combination, a frame, a source of power on the frame, an operating member, a power head turnably mounted on the frame and including a pair of sections one of which carries the operating member, driving means on the other head section, a gear rigidly mounted on the head section which carries the operating member, a gear rigidly mounted on the frame, gears on the head section which carries the driving means one meshing with the rigid gear on the frame, and the other meshing with the rigid gear of the other head section, instrumentalities operatively connecting the gears of the head section carrying the driving member with the said driving member, power transmitting means connecting the source of power with the driving means for rotation of the latter, and clutch mechanism between the power transmitting means and the driving means for selectively connecting the gears of the head section carrying the driving means with the power transmitting means to rotate the entire power head and the head section which carries the operating means selectively to thereby move the operating member in different vertical planes longitudinally and transversely with respect to the frame.

JAMES W. MENHALL.